United States Patent
Senga et al.

(10) Patent No.: US 7,310,293 B2
(45) Date of Patent: Dec. 18, 2007

(54) METHOD AND APPARATUS FOR CONTROLLING LASER POWER USING A TEST LIGHT EMISSION PATTERN HAVING A MULTIPULSE LIGHT EMISSION INTERVAL

(75) Inventors: Hisashi Senga, Osaka (JP); Hiromichi Ishibashi, Osaka (JP); Toshio Matsumoto, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 544 days.

(21) Appl. No.: 10/815,782

(22) Filed: Apr. 2, 2004

(65) Prior Publication Data
US 2004/0257940 A1 Dec. 23, 2004

(30) Foreign Application Priority Data
Apr. 4, 2003 (JP) ............................ P2003-101249

(51) Int. Cl.
*G11B 7/125* (2006.01)
(52) U.S. Cl. ................................. 369/47.53; 369/59.12
(58) Field of Classification Search ............ 369/47.26, 369/47.53; G11B 7/00, 20/10
See application file for complete search history.

(56) References Cited

U.S. PATENT DOCUMENTS

| 6,097,020 A | 8/2000 | Karasaki |
| 6,611,480 B2 | 8/2003 | Ishibashi et al. |
| 6,631,109 B2 * | 10/2003 | Nakamura ................ 369/59.11 |
| 6,728,178 B2 * | 4/2004 | Koishi et al. ............ 369/47.53 |
| 6,781,937 B2 * | 8/2004 | Nakajo ..................... 369/59.12 |
| 2002/0070329 A1 * | 6/2002 | Koishi et al. |

FOREIGN PATENT DOCUMENTS

| JP | 2000-244054 | 9/2000 |
| JP | 2002-203320 | 7/2002 |

OTHER PUBLICATIONS

MAT (machine assisted translation) of JP 2002-203320.*
English Language Abstract of JP2002-203320.
English Language Abstract of JP 2000-244054.

* cited by examiner

Primary Examiner—Aristotelis M. Psitos
(74) Attorney, Agent, or Firm—Greenblum & Bernstein, P.L.C.

(57) ABSTRACT

Method for controlling a laser power used in recording on an optical disk includes: causing the laser to emit a test light emission pattern including a multipulse light emission interval and an at-bottom value continuous light emission interval; receiving the test light emission pattern of the laser to convert the pattern to an electric signal and to thereby obtain a light detection signal; calculating a detection value of a multipulse average value from the average value of the light detection signal, and calculating a bottom detection value from the light detection signal to obtain a light emission power characteristic of the laser on a supplied current based on the detection value of the multipulse average value and the bottom detection value; and controlling the current supplied to the laser based on the light emission power characteristic on the current supplied to the laser.

20 Claims, 12 Drawing Sheets

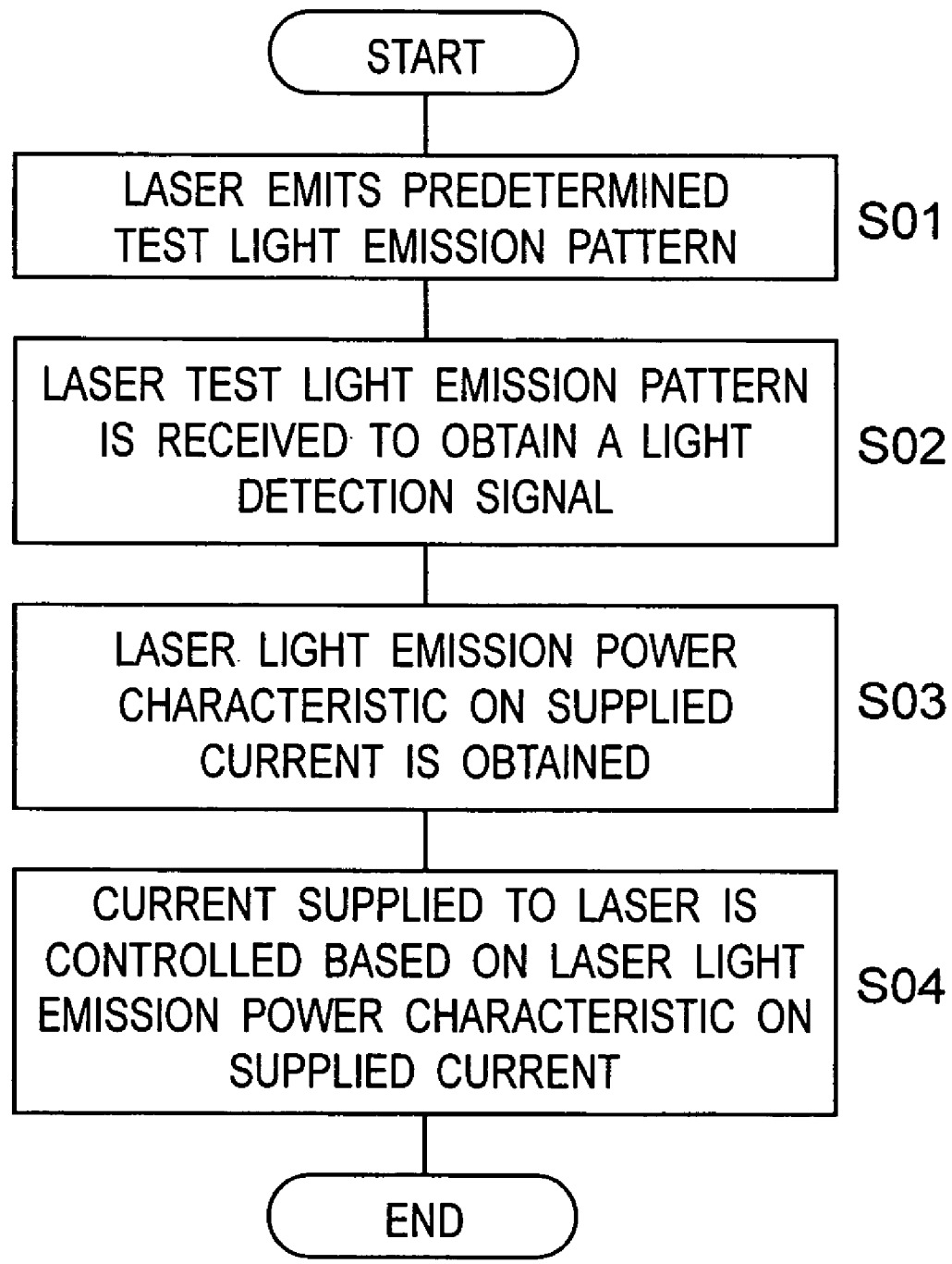

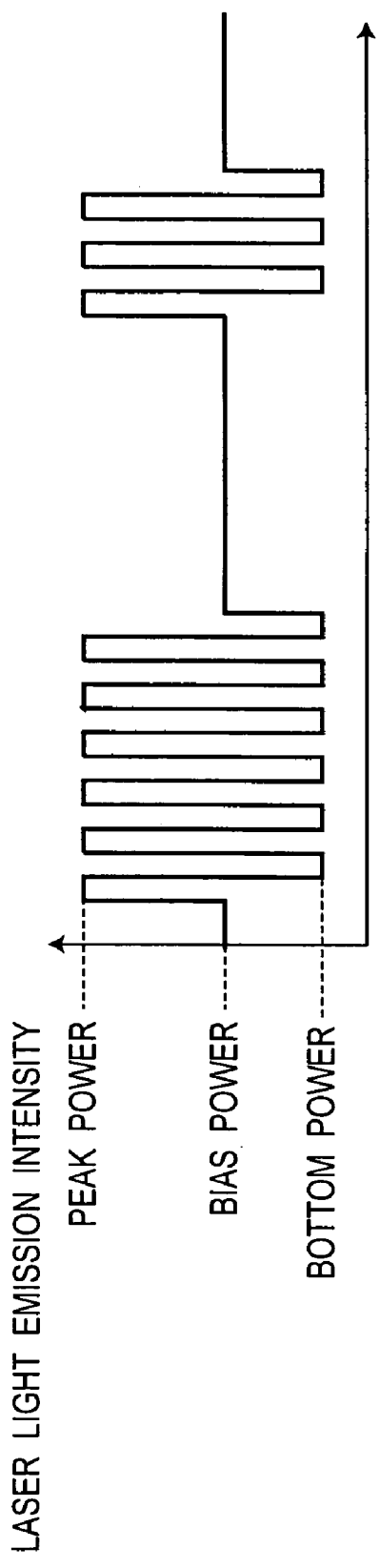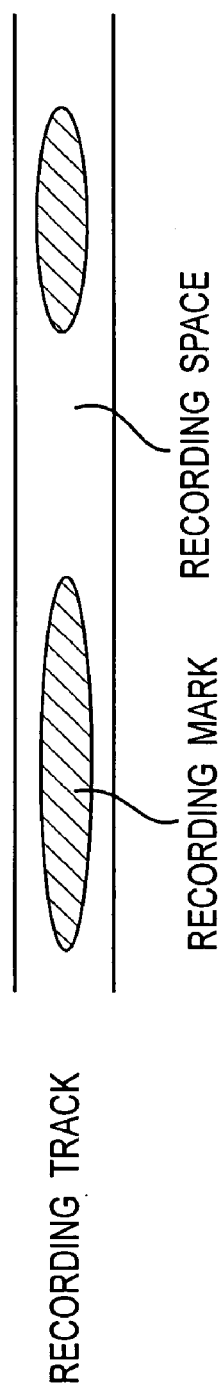

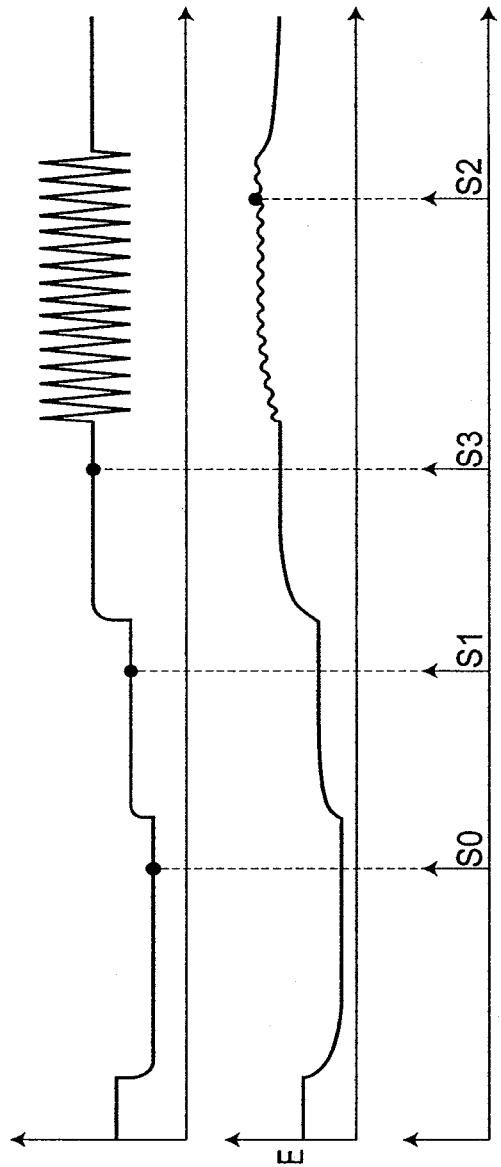
Fig. 7A FORMAT ON DISK
Fig. 7B TEST LIGHT EMISSION PATTERN INTERVAL
Fig. 7C LASER LIGHT EMISSION INTENSITY
Fig. 7D LASER POWER DETECTION VOLTAGE
Fig. 7E MULTIPULSE AVERAGE VALUE DETECTION VOLTAGE
Fig. 7F SAMPLING HOLD TIMING

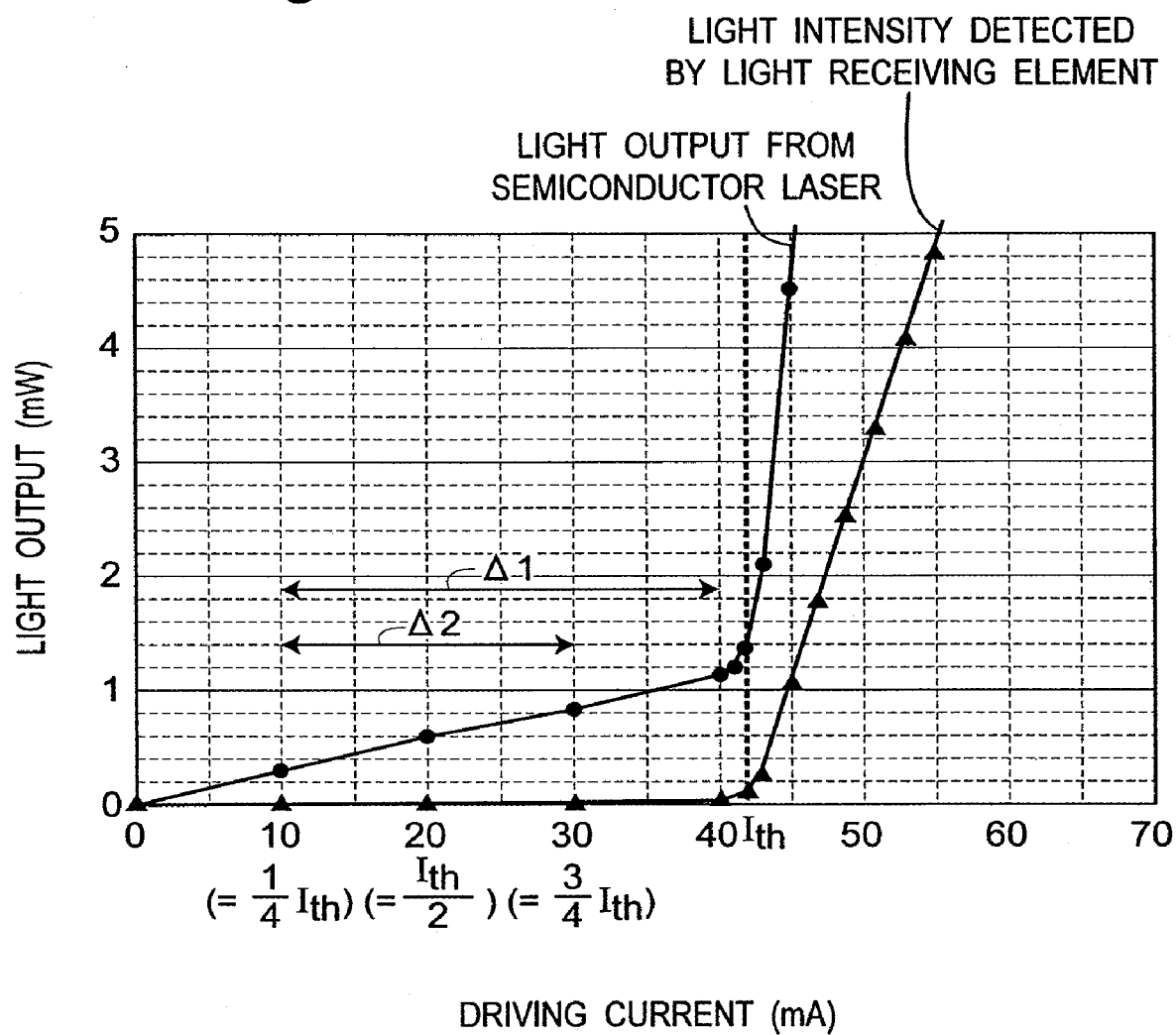

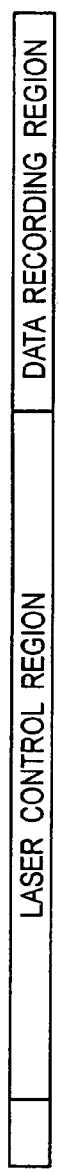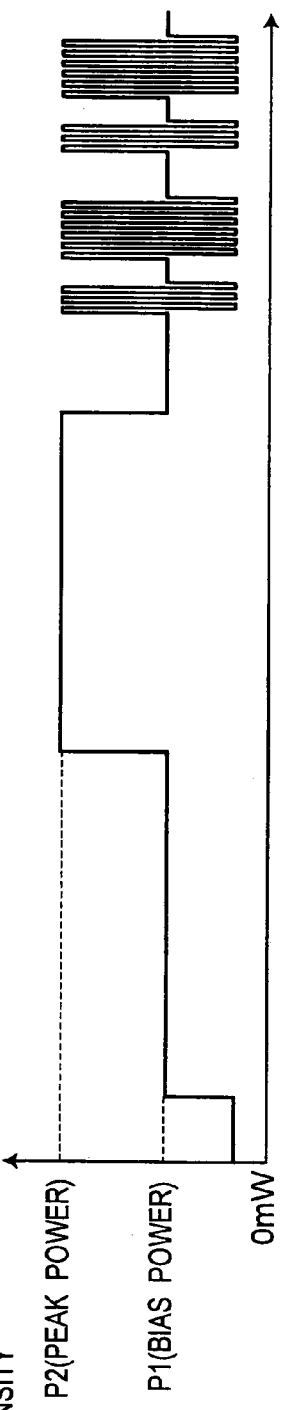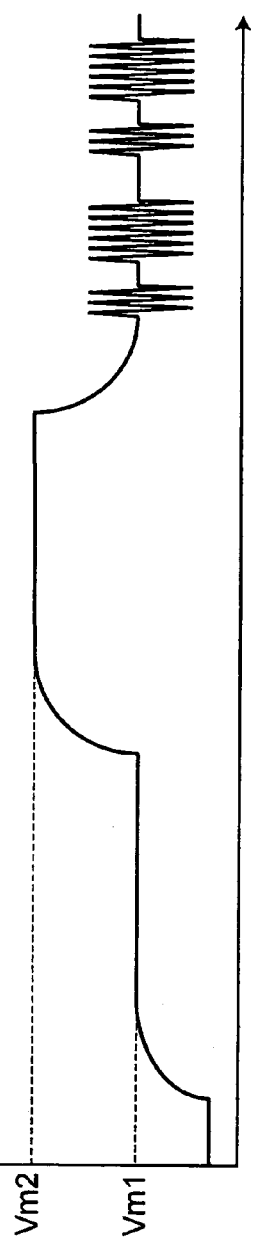
Fig. 9A FORMAT ON DISK
Fig. 9B LASER LIGHT EMISSION INTENSITY
Fig. 9C LASER POWER DETECTION VOLTAGE

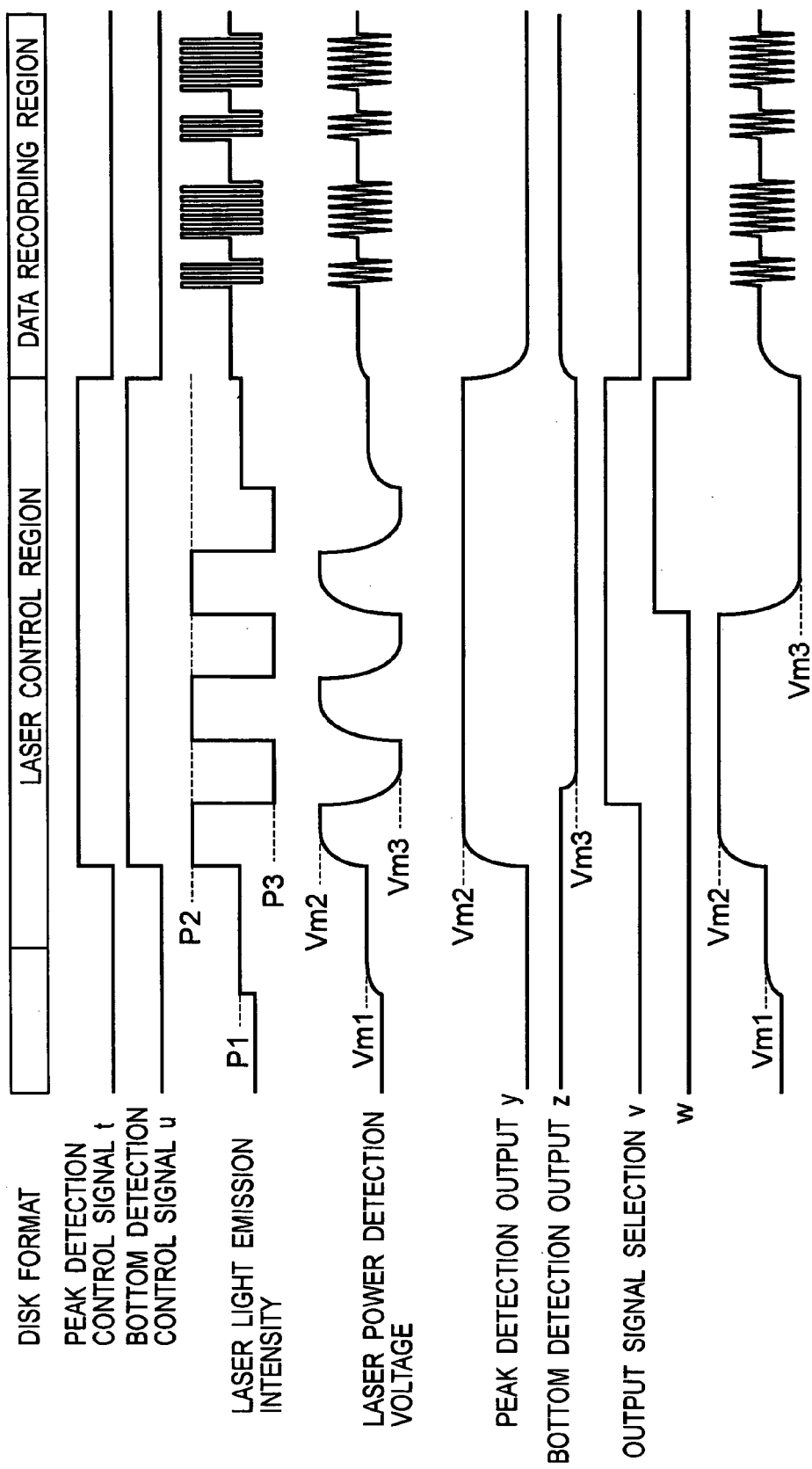

METHOD AND APPARATUS FOR CONTROLLING LASER POWER USING A TEST LIGHT EMISSION PATTERN HAVING A MULTIPULSE LIGHT EMISSION INTERVAL

BACKGROUND OF THE INVENTION

1. Field of the Invention

The invention relates to a laser power control apparatus and a laser power control method.

2. Description of the Related Art

In recent years, in the fields of an auxiliary storage device for a computer, a consumer video cassette recorder and the like, a demand for a rewritable optical disk device has been on the rise. Generally, a semiconductor laser light source has been employed for formation of a recording mark on an optical disk. There is a necessity for a semiconductor laser to emit a light pulse for formation of a good recording mark. In order to form a recording mark, for example, a semiconductor laser is, as shown in FIG. 6, intensity-modulated between a peak power and a bottom power to perform multipulse light emission. For formation of a recording space, a semiconductor laser emits light continuously for a predetermined time at a bias power. In order to secure a stable recording performance, it is necessary to control the laser powers precisely. A power characteristic of a semiconductor laser, however, is greatly affected by an ambient temperature or the like. Accordingly, even if powers are set once prior to recording to supply given driving currents, the powers have no chance to be kept at the given values, resulting in fluctuations in the powers accompanying a rise in temperature of a semiconductor laser body or its peripheral equipment.

As a means to avoid fluctuations in the powers, it is useful to calibrate the powers in regular intervals. In an optical disk format having a sector structure, for example, there is provided a laser control region in a sector for calibrating a laser power one time at each sector. In this case, each time a light spot passes over a laser control region, a power is calibrated in the laser control region, thereby enabling fluctuations in the powers to be avoided.

A description will be given of a power calibration method in a laser control region in the conventional art using FIG. 9 below.

(a) When a light spot arrives at a laser control region, a given current Iop1 is supplied to a laser. A laser power P1 at this time is detected as a laser power detection voltage Vm1 by a laser power detecting means including a light receiving element and a current-voltage conversion circuit.

(b) Then, a given current Iop2 is supplied to the laser. A laser power P2 at this time is detected as a detection voltage Vm2 by the laser power detecting means. The laser power detection voltages Vm1 and Vm2 are converted by an arithmetic circuit to the respective laser powers P1 and P2.

With such a procedure applied, as shown in FIG. 10, it is possible to obtain a relationship of a laser power with a laser driving current in calibration (hereinafter the relationship is referred to "a laser I-L characteristic"). Therefore, by driving a laser with a driving current corresponding to a desired power in the recording region, the laser can be driven with a desired power (this scheme is hereinafter referred to as "continuous (DC) light emission scheme).

A problem remains in the continuous light emission scheme, however. In a case where a frequency characteristic of a light receiving element is low, a laser has to be driven for a long time at given values in order to settle laser power detection voltages Vm1 and Vm2. In a case where a laser is continuously emitted at the power P2 of the order of a recording peak power as compared with the power P1 of the order of an erase power, a recording film on an optical disk is illuminated with a continuous high power, leading to degradation of the recording film formed by vapor deposition. In each data rewriting, illumination with the continuous high power to the recording film was performed and repeated for a long time, which would result in inconveniences that not only is the laser control region degraded, but the degradation of a recording film is also spread into even a data recording region. Since light emission is repeated in each of laser control regions continuously at a high power for a long time, a lifetime of a semiconductor laser has a high possibility to be shortened.

As a method to avoid the problem as described above, there has been disclosed a method as taught in, for example, Japanese Laid-open Patent Publication No. 2000-244054. A description will be given of a power calibration method in a laser control region in Japanese Laid-open Patent Publication No. 2000-244054 with reference to FIGS. 11 and 12.

FIG. 11 is a block diagram of a configuration of a laser control apparatus in Japanese Laid-open Patent Publication No. 2000-244054. FIG. 12 is an operation sequence diagram of the apparatus.

(a) When a light spot arrives at a laser control region, a driving current Iop1 is supplied to a laser by a laser driving circuit 140 to perform a continuous (DC) light emission at the bias power P1.

(b) A light emission power at this time is detected by a laser power detecting means 100. The laser power detecting means 100 is constituted of a light receiving element 101, a current-voltage conversion circuit 102, a peak detecting circuit 116, a bottom detecting circuit 115 and a multiplexer 117.

(c) The multiplexer 117 is configured so as to select a peak detection voltage y outputted from a peak detecting circuit 116, a bottom detection voltage z outputted from a bottom detecting circuit 115 and a through output x of the current-voltage conversion circuit 102 according to control signals v and w from the outside.

(d) In continuous (DC) light emission at an erase power P1, the through output x is selected by the multiplex 117 to output Vm1 as a laser power detection voltage.

(e) In succession, driving currents Iop2 and Iop3 are supplied while being switched therebetween to the laser to thereby perform pulse light emission between a recording peal power P2 and a bottom power P3.

(f) A light emission power at this time is detected by the laser power detecting means 100. In this situation, there is outputted a switching waveform between Vm2 and Vm3 as a through output x from the current-voltage conversion circuit 102. From the peak detecting circuit 116, there is outputted a peak detection output y in which the peak level Vm2 of the through output x is held for a given period. From the bottom detecting circuit 115, there is outputted a bottom detection output z in which the bottom level Vm3 of the through output x is held for a given period. The peak detection output y and the bottom detection output z are selected by the multiplexer 117 in a proper manner to output Vm2 or Vm3 as a laser power detection voltage.

The laser power detection voltages Vm1, Vm2 and Vm3 produced in such ways are converted to digital values by the AD conversion circuit 121 to further convert the digital values to laser powers P1, P2 and P3 with an arithmetic processor 125. Thus, an I-L characteristic of the laser can be produced by the arithmetic processor 125.

With such a construction adopted, the same output as a detection output obtainable by continuously driving a semiconductor laser itself for a long time can be produced from the peak detecting circuit 116 since the peak level Vm2 is held for a given period. In this scheme, since the semiconductor laser emits light pulses, so a laser power illuminated to a recording film is reduced as compared with a continuous (DC) light emission scheme, damage caused on a recording film decreases, thereby enabling reduction in lifetime of a semiconductor laser to be alleviated.

Even in the above scheme having the construction, there have been remained problems. In a case where a higher speed recording is tried, or in a case where a higher precision DC characteristic is requested by a laser power detecting unit and a frequency characteristic of a current-voltage conversion circuit can not be sufficiently secured, an output of the current-voltage conversion circuit does not reach Vm2 or Vm3 to thereby reduce a power detecting precision. Furthermore, in a case where a width of a light pulse is increased for the purpose to cause an output of the current-voltage conversion circuit to reach Vm2 and Vm3, there occur inconveniences such as damage caused on a recording film, reduction in lifetime of a semiconductor laser and the like in a similar way to that in the continuous (DC) light emission scheme.

SUMMARY OF THE INVENTION

It is an object of the invention to provide a semiconductor laser power control method capable of correctly controlling a laser power at a desired level even in a case where a frequency characteristic of a laser power detecting means is not sufficiently secured.

In accordance with one aspect of the present invention, there is a method for controlling a laser power used in recording on an optical disk, the method including:

causing the laser to emit a test light emission pattern including a multipulse light emission interval in which a pulse current intensity-modulated between a peak value current and a bottom value current in formation of a recording mark onto the optical disk is supplied to thereby cause the laser to emit light pulses; and an at-bottom value continuous light emission interval in which the bottom value current is continuously supplied for a predetermined time to thereby cause the laser to emit light continuously;

receiving the test light emission pattern of the laser to convert the pattern to an electric signal and to thereby obtain a light detection signal;

calculating a detection value of a multipulse average value from the average value of the light detection signal in the multipulse light emission interval, and calculating a bottom detection value from the light detection signal in the at-bottom value continuous light emission interval to thereby obtain a light emission power characteristic of the laser on the supplied current based on the detection value of the multipulse average value and the bottom detection value; and controlling the current supplied to the laser based on the light emission power characteristic on the current supplied to the laser.

In the step of causing the laser to emit the test light emission pattern, the test light emission pattern used preferably further includes an at-bias value continuous light emission interval in which a bias value current in formation of a recording space is supplied continuously for a predetermined time to thereby cause the laser to emit light continuously. In this case, in the step of obtaining the light emission power characteristic of the laser, a bias detection value is further calculated based on the light detection signal in the at-bias value continuous light emission interval to thereby obtain the light emission power characteristic of the laser on the supplied current based on the bias detection value, the detection value of a multipulse average value and the bottom detection value.

In the step of causing the laser to emit the test light emission pattern, the test light emission pattern used preferably further includes a spontaneous light emission interval in which a current less than a threshold current at which the laser emits light is supplied to the laser to cause spontaneous light emission. In this case, in the step of obtaining the light emission power characteristic of the laser, an offset is detected based on a detection value of the light detection signal in the spontaneous light emission interval.

In the step of causing the laser to emit the test light emission pattern, the test light emission pattern used preferably further includes a light-off interval in which a supplied current is set substantially to zero to turn the laser off. In this case, in the step of obtaining the light emission power characteristic of the laser, an offset is detected based on a detection value of the light detection signal in the light-off interval.

In a laser power control method related to the invention, a time width Tmp of the multipulse light emission interval preferably satisfies the following relation with respect to a time width Tmax of the longest recording mark of data in a recording region of the optical disk:

Tmax<Tmp.

The time width Tmp of the multipulse light emission interval preferably satisfies the following relation with respect to a wobble cycle $T_{wbl}$ on a recording track of the optical disk:

Tmp<$T_{wbl}$/2.

A time width Tb of the at-bottom value continuous light emission interval preferably satisfies the following relation with respect to a time width Tmax of the longest recording mark of data in a recording region of the optical disk:

Tmax<Tb.

The time width Tb of the at-bottom value continuous light emission interval preferably satisfies the following relation with respect to a wobble cycle $T_{wbl}$ on a recording track of the optical disk:

Tb<$T_{wbl}$.

A time width Tmp of the multipulse light emission interval and a time width Tb of the at-bottom value continuous light emission interval preferably satisfy the following relation with respect to a time width $T_{apcarea}$ during which scanning is performed over a laser power control region provided on the optical disk for controlling a power of the laser:

Tmp+Tb<$T_{apcarea}$.

A time width Te of the at-bias value continuous light emission interval preferably satisfies the following relation with respect to a time width Tmax of the longest recording mark of data in a recording region of the optical disk:

Tmax<Te.

A time width Te of the at-bias value continuous light emission interval preferably satisfies the following relation with respect to a wobble cycle $T_{wbl}$ on a recording track of the optical disk:

$Te < T_{wbl}/2$.

A time width T0 of the spontaneous light emission interval preferably satisfies the following relation with respect to a time width Tmax of the longest recording mark of data in a recording area of the optical disk:

$Tmax < T0$.

The time width T0 of the spontaneous light emission interval preferably satisfies the following relation with respect to a wobble cycle $T_{wbl}$ on a recording track of the optical disk:

$T0 < T_{wbl}$.

A time width T0 of the light-off interval preferably satisfies the following relation with respect to a time width Tmax of the longest recording mark of data in a recording area of the optical disk:

$Tmax < T0$.

The time width T0 of the light-off interval preferably satisfies the following relation with respect to a wobble cycle $T_{wbl}$ on a recording track of the optical disk:

$T0 < T_{wbl}$.

In a laser power control method related to the invention, in the spontaneous light emission interval, a current $I_{led}$ supplied to the laser preferably satisfies the following relation with respect to a threshold current Ith of the laser:

$Ith/4 \leq I_{led} < Ith$.

In the spontaneous light emission interval, a current $I_{led}$ supplied to the laser more preferably satisfies the following relation with respect to a threshold current Ith of the laser:

$Ith/4 \leq I_{led} \leq Ith*3/4$.

In the spontaneous light emission interval, a current $I_{led}$ supplied to the laser further more preferably satisfies the following relation substantially with respect to a threshold current Ith of the laser:

$I_{led} = Ith/2$.

An apparatus for controlling a power of a laser used in recording on an optical disk including:

a formatter having a test light emission pattern including a multipulse light emission interval in which a pulse current intensity-modulated between a peak value current and a bottom value current in formation of a recording mark onto the optical disk is supplied to the laser to thereby cause the laser to emit light pulses; and an at-bottom value continuous light emission interval in which the bottom value current is continuously supplied to the laser for a predetermined time to thereby cause the laser to emit light continuously;

a laser driving unit supplying a current to the laser based on the test light emission pattern transmitted from the formatter to cause test light emission;

a laser power detecting unit receiving the test light emission pattern of the laser to convert the pattern to an electric signal and to thereby obtain a light detection signal; and an arithmetic unit which calculates a detection value of a multipulse average value from the average value of the light detection signal in the multipulse light emission interval, and which calculates a bottom detection value from the light detection signal in the at-bottom value continuous light emission interval to obtain a light emission power characteristic of the laser on a supplied current based on the detection value of a multipulse average value and the bottom detection value, and to control the current supplied to the laser based on the light emission power characteristic.

In a laser power control apparatus related to the invention, the test light emission pattern preferably further includes an at-bias value continuous light emission interval in which a bias value current in formation of a recording space is supplied to the laser continuously for a predetermined time to thereby cause the laser to emit light continuously. In this case, in the arithmetic unit, a bias detection value is further calculated based on the light detection signal in the at-bias value continuous light emission interval to thereby obtain the light emission power characteristic of the laser on the supplied current based on the bias detection value, the detection value of the multipulse average value and the bottom detection value.

In a laser power control apparatus related to the invention, the test light emission pattern preferably further includes a spontaneous light emission interval in which a current less than a threshold current of the laser is supplied to cause spontaneous light emission. In this case, the arithmetic unit can detect an offset based on a detection value of the light detection signal in the spontaneous light emission interval.

It is noted that the laser power control method and the laser power control apparatus according to the invention may be performed on a laser control region provided on a recording track of the optical disc to calibrate a power of the laser.

According to a laser power control method of the invention, since the average value in a multipulse light emission interval is detected to control a laser power based on detection information on the average value, each of power values of light pulses can be controlled with good precision even in a case where a frequency characteristic of laser power detecting means cannot be sufficiently secured.

According to a laser power control method of the present invention, an offset can be detected based on a detection value of a light detection signal in the spontaneous light emission interval. Because, provided in a test light emission pattern is a spontaneous light emission interval in which a current less than a threshold value is supplied to the laser to thereby cause the laser to effect spontaneous light emission. Therefore, by using this value, calibration could be implemented even on an offset to be caused by a temperature drift in the receiving light element or the current-voltage conversion circuit in the laser detecting means due to a change in an ambient temperature if the offset was caused by the temperature drift, leading to improvement on detection precision of each power value.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 5 is a flowchart of a laser power control method related to the first embodiment of the invention;

FIGS. 6A and 6B are representations of correspondence between recording pulse waveforms and a recording mark of an optical disk recording/reproducing apparatus;

FIGS. 7A-7F illustrate an operation sequence diagram of a laser power control apparatus related to a second embodiment of the invention;

FIG. 8 is a graph of a light output of a semiconductor laser and a light intensity detected by a light receiving element in the second embodiment of the invention;

FIGS. 9A-9C illustrate an operation sequence diagram of a laser control method in the conventional art;

FIG. 12 is an operation sequence diagram in the laser control apparatus in the conventional art.

DETAILED DESCRIPTION OF THE PREFERRED EMBODIMENTS

Figure 1:
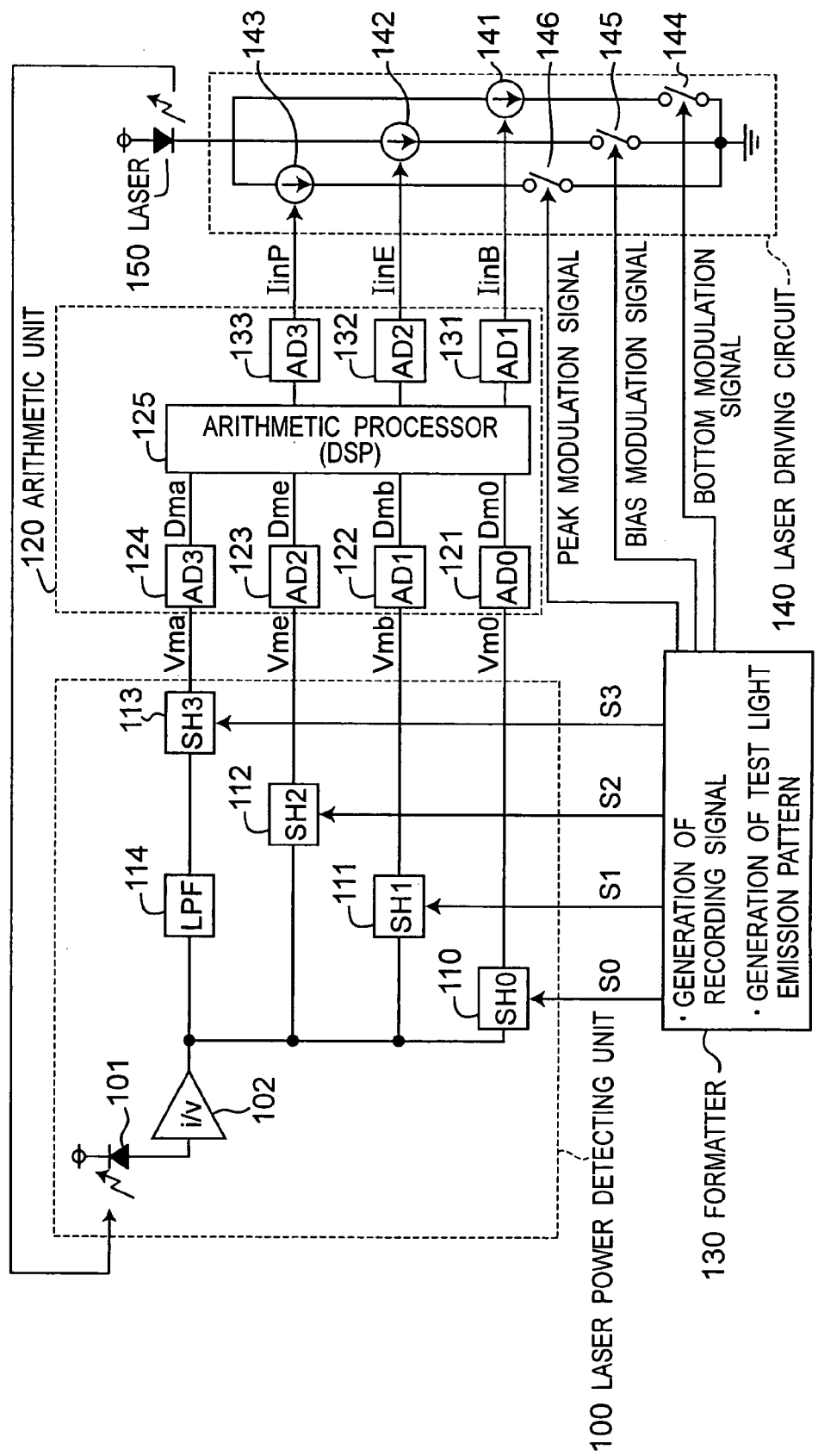
FIG. 1 is a block diagram of a configuration of a laser power control apparatus in a first embodiment of the invention.

Embodiments of the present invention will be described below with reference to the accompanying drawings. The constituent elements numbered the same reference numeral in the drawings denote the constituent elements having a same function.

First Embodiment

FIG. 1 is a block diagram of a laser power control apparatus in a first embodiment of the invention. The laser power control apparatus includes: a laser driving circuit 140 supplying a current to a laser 150 for driving it; a laser power detecting unit 100 detecting light emission of the laser 150; a formatter 130 generating a recording signal and a test light emission pattern; and an arithmetic unit 120. Then, a description will be given of parts constituting the laser power control apparatus.

In the description, first comes the laser driving circuit 140 causing the laser 150 to emit light. The laser driving circuit 140 includes: a bottom current source 141; a bias current source 142; a peak current source 143; and switches 144, 145 and 146 turned on or off according to a bottom modulation signal, a bias modulation signal and a peak modulation signal, respectively. In order to form a recording mark, a necessity arises for the laser 150 to perform multipulse emission between a peak power and a bottom power. On the other hand, in order to form a recording space, a necessity arises for the laser 150 to emit light at a bias power. A description will be given of operations in the laser driving circuit 140 below using the block diagram of FIG. 1 and an operation sequence diagram of FIG. 2.

(a) First, when light emission is effected at a bottom power, the bottom current source 141 is controlled so as to be turned on according to a bottom modulation signal from the formatter 130. Furthermore, a set current ($I_{inB}$) of the bottom current source 141 is inputted to the bottom current source 141 from the arithmetic processor 125 so that the bottom power takes a desired value.

(b) Secondly, when light emission is effected at a bias power, control is performed according to a bias modulation signal from the formatter 130 so that the bias current source 142 is added to the bottom current source 141. Furthermore, a set current ($I_{inE}$) of the bias current source 142 is inputted to the bottom current source 141 from the arithmetic processor 125 so that the bias power takes a desired value when the bias current source 142 and the bottom current source 141 are added together.

(c) Thirdly, when light emission is effected at a peak power, control is performed according to a peak modulation signal and a bias modulation signal from the formatter 130 so that the peak current source 143 is added to the sum of the bias current source 142 and the bottom current source 141. Furthermore, a set current ($I_{inP}$) of the peak current source 143 is inputted to the peak current source 143 from the arithmetic processor 125 so that the peak power takes a desired value when the peak current source 143, the bias current source 142 and the bottom current source 141 are added together.

With the operations as described above adopted, a modulation current is supplied to the laser 150, thereby enabling the laser 150 to emit light pulses.

The laser power control apparatus, upon the start of scanning in a laser control region provided on a recording track, outputs a specific light emission pattern for the purpose to calibrate a power of the laser 150 to obtain a relationship between a laser driving current and a light emission intensity (the relationship is hereinafter referred to as an "I-L characteristic" and this operation is hereinafter referred to as "test light emission"). The test light emission is implemented in a specific light emission pattern in which as shown in an operation sequence of FIG. 3, the laser is turned off in a time width T0, thereafter performs continuous (DC) emission in a time width Tb at the bottom power, then performs continuous emission in a time width Te at the bias power and again thereafter performs multipulse light emission in a time width Tm (this light emission pattern is hereinafter referred to as a "test light emission pattern"). When a detection window width of a recording mark is Tw and the length of the longest of recording marks is Tmax and a wobble cycle on a recording track is $T_{wbl}$ by definition, the light-off interval T0 is set to be T0=$T_{wbl}$.

The others are also set as described below:

The time width Tb of the bottom power light emission interval is to be Tb=30 Tw, the time width Te of the bias power light emission interval is to be Te=16 Tw and the time width Tmp of the multipulse light emission interval is to be Tmp=16 Tw.

In addition, it is assumed that an I-L characteristic of the laser is approximately predicted before test light emission and, also predicted from the predicted characteristic are a laser driving current $I_{testB}$ corresponding to a desired bottom power, a laser driving current $I_{testE}$ corresponding to a desired bias power and a laser driving current $I_{testP}$ corresponding to a desired peak power. Accordingly, currents of the respective current sources in the test light emission are set as follows:

A set current $I_{inB}$ of the bottom current source 141 is $I_{inB}=I_{testB}$, a set current $I_{inE}$ of the bias current source 142 is $I_{inE}=I_{testE}-I_{testB}$, and a set current value $I_{inP}$ of the peak current source 143 is $I_{inP}=I_{testP}-I_{testE}$.

With the procedure adopted, currents from the laser driving circuit 140 to the laser 150 are set. The set current from the laser driving circuit 140 is supplied to the laser 150 to thereby cause the laser 150 to emit light and generate light pulses.

Then, a description will be given of laser power detecting means 100 detecting a light pulse generated from the laser 150. The laser power detecting means 100 includes: a light receiving element 101; a current-voltage conversion circuit 102; a sample hold circuit (SH0) 110; a sample hold circuit (SH1) 111; a sample hold circuit (SH2) 112; a low-pass filter 114; and a sample hold circuit (SH3) 113. The light receiving element 101 receives laser light to then output a laser power as a current. An output current of the light receiving element 101 is converted by the current-voltage conversion circuit 102 to a voltage value.

Figure 3:
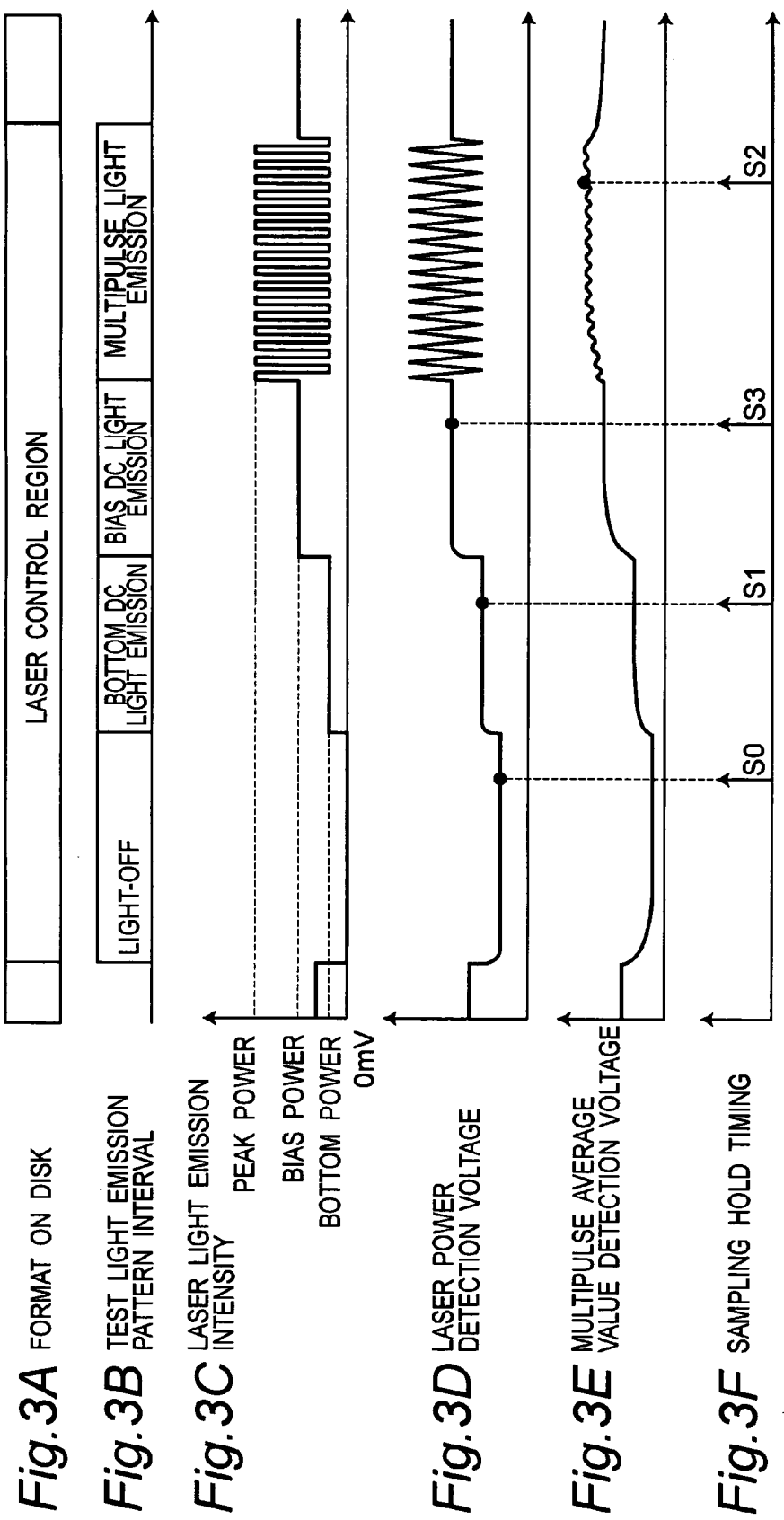
FIGS. 3A-3F illustrate an operation sequence diagram in the laser power control apparatus in the first embodiment of the invention.

Then, a description will be given of operations in the laser power detecting means 100 in a case where a test light emission pattern is emitted from the laser 150 using the block diagram of FIG. 1 and the operation sequence diagram of FIG. 3.

(a) In the light-off interval in the test light emission pattern, the sample hold circuit (SH0) 110 holds an output voltage of the current-voltage conversion circuit 102 according to a sample hold signal S0 and outputs a 0 mW level detection voltage Vm0.

(b) Thereafter, in the bottom power light emission interval, the sample hold circuit (SH1) 111 holds an output voltage of the current-voltage conversion circuit according to a sample hold signal S1 and outputs a bottom power detection voltage Vmb.

(c) Thereafter, in the bias power light emission interval, the sample hold circuit (SH2) 112 holds an output voltage of the current-voltage conversion circuit according to a sample hold signal S2 and outputs a bottom power detection voltage Vme.

(d) Thereafter, in the multipulse light emission interval, an output of the current-voltage conversion circuit 102 is limited in band width by the low-pass filter 114 so that a voltage corresponding to the average value of multipulse light emission is produced. The sample hold circuit (SH3) 113 holds a voltage corresponding to the average value of the multipulse light emission thus produced according to a sample hold signal S3 and outputs a detection value Vma of the multipulse average value.

Furthermore, a description will be given of the arithmetic unit 120. The arithmetic unit 120 includes: AD conversion circuits 121, 122, 123 and 124; an arithmetic processor 125; and DA conversion circuits 131, 132 and 133.

(a) A 0 mW level detection voltage Vm0 produced by the laser power detection means 100, a bottom power detection voltage Vmb, a bias power detection voltage Vme and a multipulse portion average power detection voltage Vma are inputted to the respective AD conversion circuits (AD0) 121, (AD1) 122, (AD2) 123 and (AD3) 124 and converted to a 0 mW level detection value Dm0, a bottom power detection value Dmb, a bias power detection value Dme and a multipulse portion average power detection value Dma, respectively, as digital values.

(b) An offset calibration in the laser power detection means is performed by the arithmetic processor (DSP) 125 using the 0 mW level detection value Dm0 and the digital values are converted to power values. That is, a difference produced by subtracting Dm0 from Dmb is converted to a bottom detection power $P_{monB}$, a difference produced by subtracting Dm0 from Dme is converted to a bias detection power $P_{monE}$, and a difference produced by subtracting Dm0 from Dma is converted to a multipulse average detection power $P_{monA}$.

(c) Thereafter, the arithmetic unit 125 acquires an I-L characteristic of the laser at this time point in a procedure described below and determines a set current to the laser driving circuit 140 in voltage terms so that light emission is performed at a desired laser power. Note that a description will be given of determination procedures in the arithmetic processor 125 for set current values of the respective current sources 141, 142 and 143 supplied to the laser driving circuit 140 later.

(d) Then, on the basis of voltage values equivalent to the set current values determined in the arithmetic processor 125, a set current value $I_{inB}$ of the bottom current source 141 is set through the DA conversion circuit 131, a set current value $I_{inE}$ of the bias current source 142 is set through the DA conversion circuit 132, and a set current value $I_{inP}$ of the peak current source 143 is set through the DA conversion circuit 133.

A description will be given of how set current values of the respective current sources 141, 142 and 143 supplied to the laser driving circuit 140 are determined in the arithmetic processor 125 below.

Figure 4:
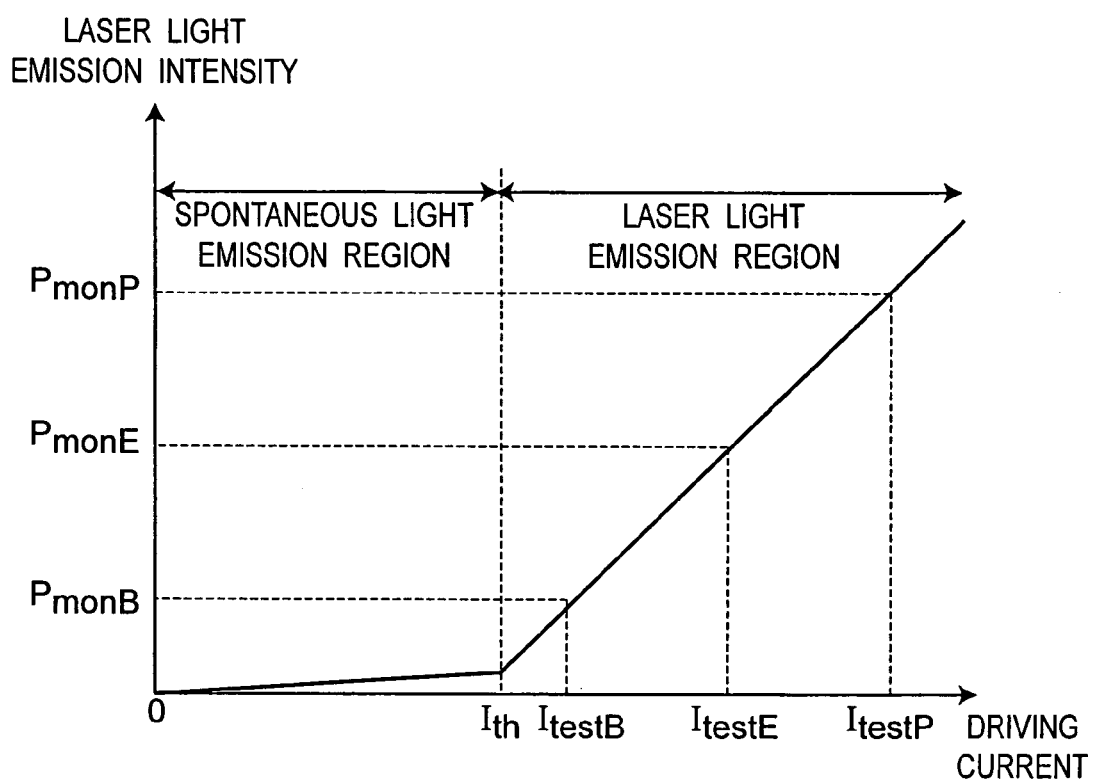
FIG. 4 is a graph of a light emission characteristic of a laser on a driving current.
Figure 10:
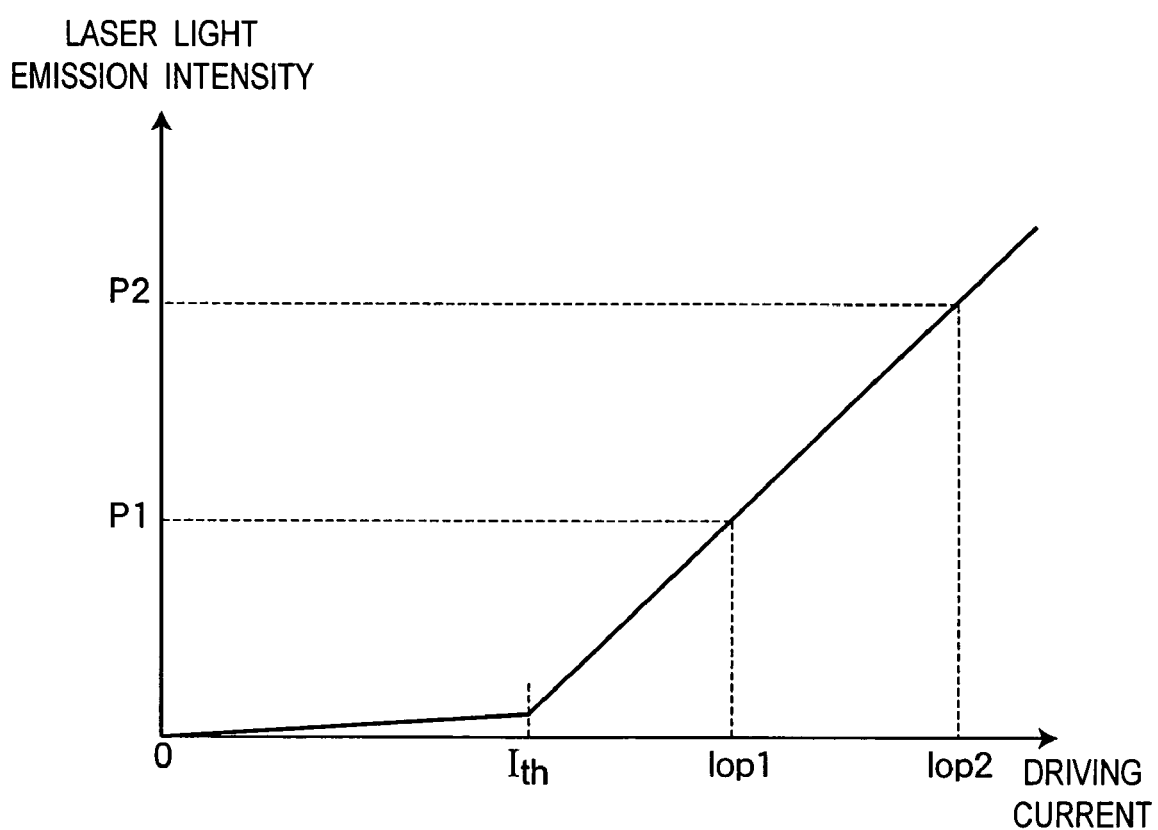
FIG. 10 is a diagram of a relationship of a laser driving current vs. a laser light intensity in the conventional art.
Figure 11:
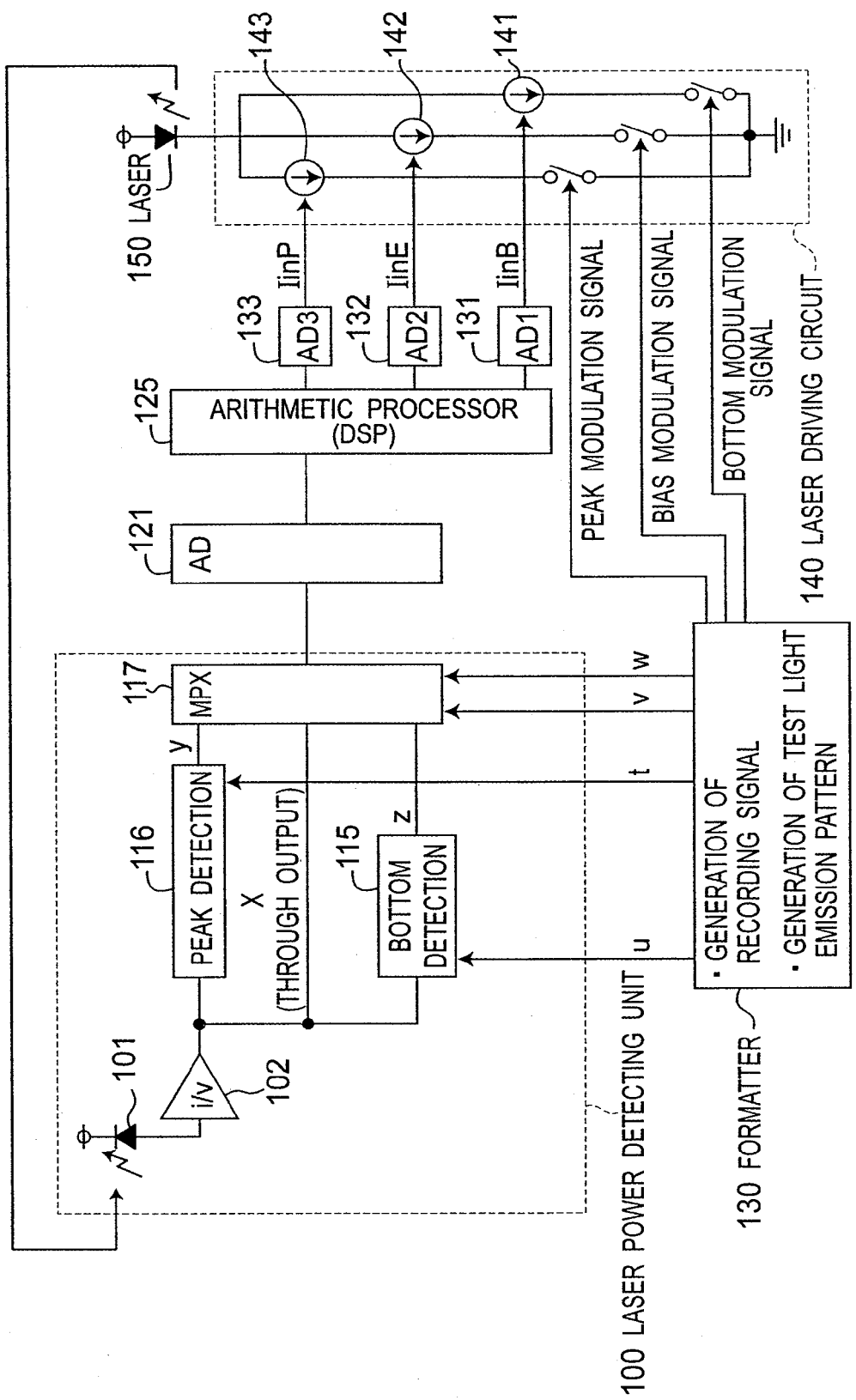
FIG. 11 is a block diagram of a configuration of a laser control apparatus in the conventional art.

FIG. 4 is a graph of an example of I-L characteristic of a laser. An I-L characteristic is, when a laser power is y and a driving current is x, expressed by the following linear function from a relationship between a bottom detection powers $P_{monP}$ and a bias detection power $P_{monE}$ and driving currents in test light emission $I_{testE}$ and $I_{testB}$ as shown in FIG. 4:

$$Y=\eta 1 * x + b1.$$

Herein, when terms in the right side are partly expressed with $P_{monB}$ and $P_{monE}$, the results are as follows:

$$\eta 1 = (P_{monE} - P_{monB})/(I_{testE} - I_{testB})$$

$$b1 = (P_{monB} * I_{testE} - P_{monE} * I_{testB})/(I_{testE} - I_{testB}).$$

Accordingly, when a desired bottom power is indicated by $P_{refB}$, a bottom power driving current IB is determined as follows:

$$IB = (P_{refB} - b1)/\eta 1.$$

Furthermore, when a desired bias power is indicated by $P_{refE}$, a bias power driving current IE is determined as follows:

$$IE = (P_{refE} - b1)/\eta 1.$$

A peak detection power $P_{monP}$ is produced by the following arithmetic operation from a multipulse average detection power $P_{monA}$ and a bottom detection power $P_{monB}$. When a duty of a multipulse portion is indicated by d, the multipulse average detection power $P_{monA}$ is expressed by the following expression:

$$P_{monA} = P_{monP} * d + P_{monB} * (1-d).$$

Therefore, the peak detection power $P_{monP}$ is produced by the following expression.

$$P_{monP} = (P_{monA} - P_{monB} * (1-d))/d.$$

An I-L characteristic of a laser is, when a laser power is y and a driving current is x, expressed by the following linear function from a relationship between a detection powers $P_{monP}$ and $P_{monB}$ and driving currents $I_{testP}$ and $I_{testB}$ as shown in FIG. 4:

$$Y = \eta 2 * x + b2.$$

Note that while in FIG. 4, an I-L characteristic of a laser is shown as a straight line with the same inclination over all the range of a driving current equal to or higher than a threshold value Ith, this is only an ideal example. Since an I-L characteristic of a laser, actually in some case, changes according to a range of a driving current I, an inclination is indicated as $\eta 1$ when a driving current is in the range of from $I_{testB}$ to $I_{testE}$ and an inclination is indicated as $\eta 2$ when a driving current is in the range of from $I_{testB}$ to $I_{testP}$. Herein, when terms in the right side are partly expressed with $P_{monP}$ and $P_{monB}$, the results are as follows:

$$\eta 2 = (P_{monP} - P_{monB})/(I_{testP} - I_{testB})$$

$$b2=(P_{monB}*I_{testP}-P_{monP}*I_{testB})/(I_{testP}-I_{testB}).$$

Accordingly, when a desired peak power is indicated by $P_{refP}$, a peak power driving current IP is determined as follows:

$$IP=(P_{refP}-b2)/\eta 2.$$

Figure 2:
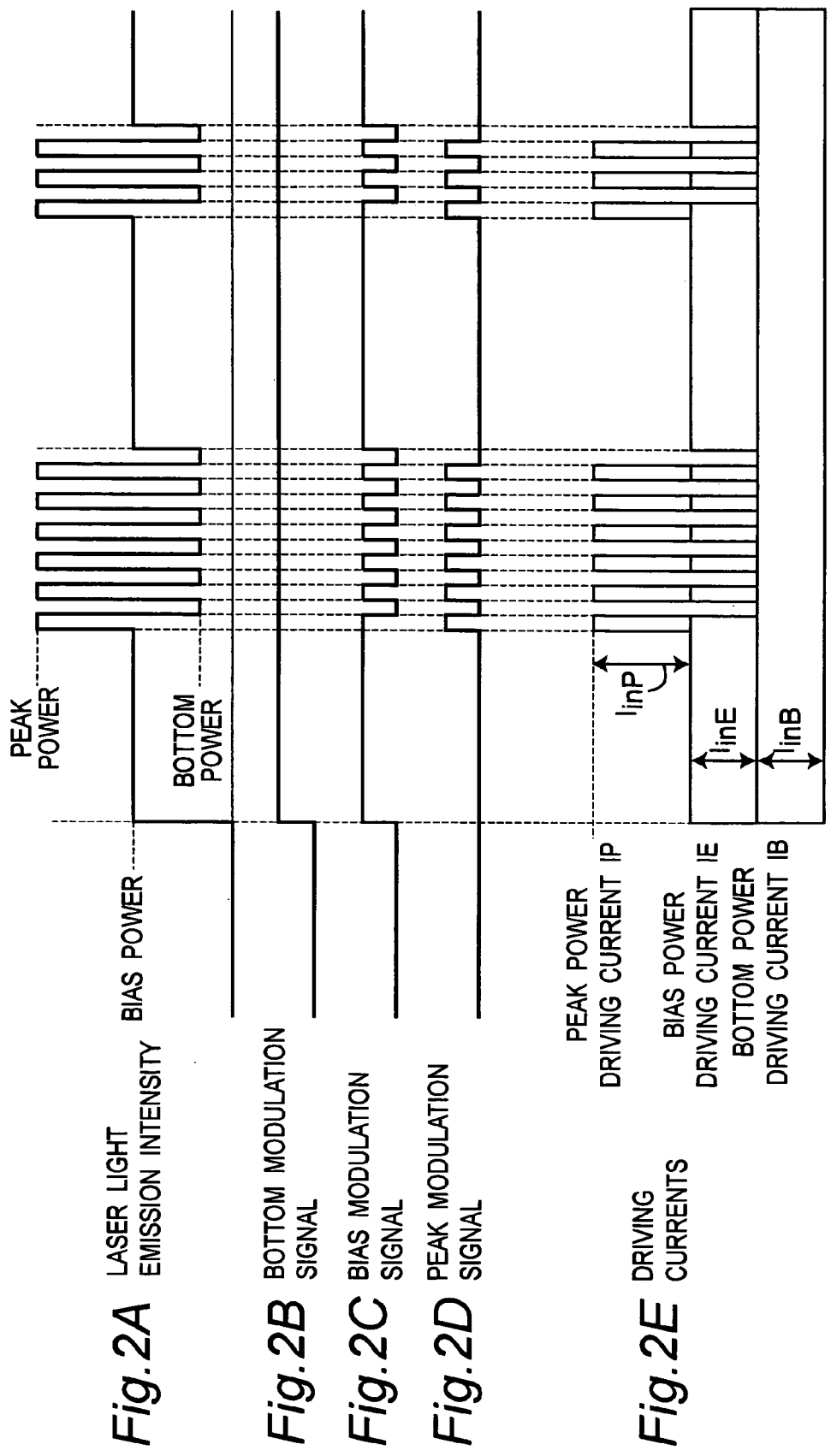
FIGS. 2A-2E illustrate an operation sequence diagram in a laser driving circuit in the first embodiment of the invention.

By performing the arithmetic operations as described above, set currents of the respective current sources are, as shown in FIG. 2, renewed as follows:

A set current $I_{inB}$ of the bottom current source 141 is $I_{inB}$=IB, a set current $I_{inE}$ of the bias current source 142 is $I_{inE}$=IE−IB, and a set current value $I_{inP}$ of the peak current source 143 is $I_{inP}$=IP−IE.

As described above, since the laser power control apparatus in the first embodiment detects the average value in a multipulse light emission interval in a laser control region to control a laser power based on detection information on the average value, power values of light pulses can be controlled with good precision even in a case where a frequency characteristic of the laser power detecting means 100 cannot be sufficiently secured.

The laser power control apparatus of the first embodiment has a light-off interval in which the laser 150 is turned off for a given period in a laser control region. In the light-off interval, an output of the current-voltage conversion circuit 102 of the laser power detecting means 100 is acquired as a 0 mW detection value that is an offset value. Accordingly, by using this value, an offset calibration can be implemented even in a case where a temperature drift occurs in the light receiving element 101 or the current-voltage conversion circuit 102 in the laser power control means 100 due to a change in ambient temperature to thereby cause an offset. Therefore, a detection precision of each power value is improved.

FIG. 5 is a flowchart of a laser power control method related to the first embodiment of the invention. A description will be given of the laser power control method below.

(a) The formatter 130 has a test light emission pattern including a multipulse light emission interval in which a pulse current switching between a peak value and a bottom value in formation of a recording mark is supplied to cause the laser 150 to emit light pulses and an at-bottom value continuous light emission interval in which a bottom value current is supplied continuously for a predetermined period to cause the laser 150 to emit light continuously. The test light emission pattern is transmitted to the laser driving circuit 140 from the formatter 130 to cause the laser 150 to emit light according to the test light emission pattern (S01). Note that the test light emission pattern may further include a light emission interval at a bias value at which light emission is effected in formation of a recording space.

(b) The laser power detecting unit 100 receives the test light emission pattern of the laser 150 to convert the pattern to an electric signal and then to obtain a light detection signal (S02).

(c) The arithmetic unit 120 calculates not only a detection value of the multipulse average value from the average value of a light detection signal in a multipulse light emission interval, but also a bottom detection value from a light detection signal in an at-bottom value continuous light emission interval to thereby obtain a light emission power characteristic of the laser 150 on a supplied current based on the detection value of the multipulse average value and the bottom detection value (S03). Note that a bias detection value is further calculated based on the light detection signal in the light emission interval at a bias value to thereby obtain a light emission power characteristic of the laser on a supplied current based on the bias detection value, the detection value of the multipulse average value and the bottom detection value.

(d) Furthermore, the arithmetic unit 120 controls a current supplied to the laser 150 based on the light emission power characteristic of the laser 150 on a supplied current (S04). Thereby, calibration can be performed even if a laser power is fluctuated due to a change in temperature or the like.

Note that the multipulse light emission interval Tmp and the bias light emission interval Te are set both to 16 Tw, for which there are the following reasons.

(1) In order to improve a detection precision of the average value in a multipulse portion, it is recommended to continue multipulse light emission in an interval as long as possible. That is, multipulse light emission for a long time can ensure that settlement of the average value of a multipulse portion is compatible with restriction of remaining ripples to be smaller. Therefore, it is considered to perform multipulse light emission for a time length similar to that in recording of the longest recording mark. For example, in a case where a recording mark is of a 1-7 modulation system, the longest mark is of 8T and thereby, a pair of a 9T mark and a 9T space is recorded as a frame 5ink sync identifying the leading position of each frame on a format. Therefore, in a test light emission pattern, it is considered that a time width Tmp of a multipulse light emission interval and a time width Te of a bias light emission interval are set both to 9Tw, whereas in such a case, the pattern can be erroneously detected as a frame sync in reproduction of a disk. Therefore, for the purpose to avoid erroneous detection of a frame sync and in addition to improve a detection precision of a multipulse portion average, it is preferable to emit a recording mark (16 Tw in this embodiment) longer than the longest recording mark Tmax including a frame sync.

(2) Since test light emission has to be completed within a laser control region, the time width Tmp of a multipulse light emission interval and the time width Te of a bias light emission interval preferably satisfy the following relations when a passage time of a laser control region is indicated by $T_{apcarea}$:

$$Tmax<Tmp<T_{apcarea}$$

$$Tmax<Te<T_{apcarea}.$$

Furthermore, since a multipulse light emission interval and a bias light emission interval are preferably included in a test light emission pattern in one laser control region, the following relation is preferably satisfied:

$$Tmp+Te<T_{apcarea}.$$

In order to improve a detection precision of a multipulse portion average value and a bias power, it is preferable to extend a time width Tmp of a multipulse light emission interval and a time width Te of a bias light emission interval to respective longer values. The time widths Tmp and Te, however, are preferably not to be longer than necessary. The reason why is that if a recording mark or a recording space is formed in a groove portion of a recording track with a light spot deviated from the center of the recording track for some reason or other in an optical disk apparatus, damage is given to the groove, resulting in a possibility of degrading a wobble extracting performance of the recording track. Accordingly, when a wobble cycle of a recording track is indicated by $T_{wbl}$, a time width Tmp of a multipulse light emission interval and a time width Te of a bias light emission interval preferably satisfy the following relations:

$$\text{Tmax} < \text{Tmp} < T_{wbl}/2$$

$$\text{Tmax} < \text{Te} < T_{wbl}/2.$$

In a case where an optical disk with Twbl≈69 Tw is adopted, the following relations are preferably satisfied:

$$\text{Tmax} < \text{Tmp} < 34\text{Tw}$$

$$\text{Tmax} < \text{Te} < 34\text{Tw}.$$

Since a bottom power is detected each time of passage over a laser control region, a detection precision of a bottom power can be improved. In addition, detection of a peak power can improve a detection precision of a bottom power since the detection of a peak power is detected with the detection value of a bottom power.

The time width Tb of a bottom power light emission interval, herein, is set to 30 Tw, for which there are the following reasons.

(1) In order to perform detection after a bottom power is settled, the time interval Tb is preferably longer than the longest recording mark Tmax. With such a longer time width Tb, a transient occurring when a reproduction state changes to a recording state is avoided even in a case where test light emission is performed immediately after the reproduction state changes to the recording state to thereby enable detection after a bottom power is settled; therefore, a detection precision of the bottom power is improved.

(2) With a longer time width Tb of a bottom power light emission interval, a detection precision of the bottom power is improved, whereas since a laser power becomes weaker in the time width Tb, an S/N ratio of a signal for tracking control on an optical disk is degraded. In a case where a sampling frequency of a tracking error signal is set to 200 kHz, it is preferable to set a time width Tb of a bottom power light emission interval preferably to 5 µs or less. Test light emission itself has to be substantially completed in a laser control region and in a case where $T_{apcarea}$ is almost 5 µs or 5 µs or less, the following relation is preferably satisfied:

$$\text{Tmax} < \text{Tb} < T_{apcarea}.$$

If it is considered to use a bottom power light emission interval and a light-off interval are used in parallel to each other, the following relation is more preferably substantially satisfied:

$$\text{Tmax} < \text{Tb} < T_{wbl}.$$

Furthermore, since a multipulse light emission interval and a bottom power light emission interval are preferably included in a test light emission pattern in one laser control region, the following relation is preferably satisfied:

$$\text{Tmp} + \text{Tb} < T_{apcarea}.$$

A time width T0 of a light-off interval, herein, is set to $T_{wbl}$, for which there are the following reasons.

(1) In order that a laser changes from a light emission state to a light-off state and a 0 mW level is settled, the longer the light-off, the better. A period in which the 0 mW level is settled depends on a characteristic of a laser driving circuit and a time width T0 of a light-off interval is preferably to be a time width longer than the longest recording mark Tmax.

(2) On the other hand, the light-off interval is preferably longer as described above, whereas since in this interval, a laser power is weak, a signal for tracking control for an optical disk disappears. A time interval Tb of a bottom power light emission interval is preferably 5 µs or less in a case where a sampling frequency of a tracking error signal is set to 200 kHz. Since test light emission has to be completed in a laser control region, the following relation is preferably satisfied when $T_{apcarea}$ is almost 5 µs or 5 µs or less:

$$\text{Tmax} < \text{T0} < T_{apcarea}.$$

Furthermore, a bottom power light emission interval and a light-off interval are used in parallel to each other, the following relation is preferably substantially satisfied:

$$\text{Tmax} < \text{T0} < T_{wbl}.$$

In the first embodiment, a test light emission pattern includes: in the following a sequence, at first, a step in which the laser is turned off; thereafter, a step in which continuous light emission is performed for a time width Tb at a bottom power; then, a step in which continuous light emission is performed for a time width Te at a bias power level; and thereafter, a step in which light emission is performed in multipulses for a time width Tm. With a test light emission pattern in this sequence adopted, since a change in a peak value is smaller in a transition state of light emission, the sequence is the most advantageous from the viewpoint of a settlement time of the current-voltage conversion circuit 102.

Accordingly, it is preferable to perform test light emission in this sequence.

The laser power control method of the first embodiment provides a light-off interval in which the laser is turned off for a given time in a laser control region.

In the light-off interval, an output of the current-voltage circuit in the laser detecting means in the light-off interval is produced as a 0 mW detection value. Therefore, by using this value, calibration could be implemented even on an offset to be caused by a temperature drift in the receiving light element or the current-voltage conversion circuit in the laser detecting means due to a change in an ambient temperature if the offset was caused by the temperature drift. Accordingly, a detection precision of each power value increases.

Second Embodiment

FIG. 7 is an operation sequence diagram of a laser power control apparatus related to a second embodiment of the invention. A laser power control method of this embodiment is different from the laser power control method related to the first embodiment in that a spontaneous light emission interval in which a current less than a threshold current Ith is supplied to the laser to cause the laser to emit spontaneous emission light is provided in a test light emission pattern instead of the light-off interval. In the first embodiment, the light-off interval is provided in which a current supplied to the laser is reduced substantially to zero to thereby turn the laser off for the purpose to calibrate an offset in the receiving element 101 or the current-voltage conversion circuit 102 in the laser power detecting means 100. On the other hand, the laser, as shown in FIG. 4, shows a spontaneous light emission region performing spontaneous light emission with a supply current less than a threshold current Ith. Therefore, as shown in FIG. 7, spontaneous light emission is caused for a time width T0 in the spontaneous light emission region (LED light emission region) instead of turning the laser off and a detection value at this time is used as a 0 mW level to calibrate an offset. FIG. 8 is a graph of a relationship of a supply current (a driving current) to a semiconductor laser element with each of a light output from the semiconductor laser element and a light intensity detected by the receiving light element in a case where a GaN based-bluish purple laser is employed. Note that since in a spontaneous light emission region, only light low in interfering property and weak in intensity is propagated to the receiving light element, only a light intensity almost equal to that in light-off is, as shown in FIG. 8, detected in the receiving light element, thereby enabling an effect almost equal to that in turning the laser 150 off to be produced. Since the laser driving circuit 140 continues to output a current, which is not zero in amount and less than a threshold current Ith, there can be performed smooth transition to a laser light emission region after the spontaneous light emission interval.

In Table 1, there is shown a relationship of a supply current (a driving current) to a semiconductor laser element with each of a light output from the semiconductor laser element and a light intensity (as converted objective lens output) detected by the light receiving element shown in FIG. 8.

TABLE 1

|  | Ith/4 | Ith/2 | Ith*3/4 | Ith |
|---|---|---|---|---|
| Driving current (mA) | 10 | 20 | 30 | 40 |
| Light output from semiconductor laser element (mW) | 0.3 | 0.6 | 0.9 | 1.2 |
| Light intensity (as converted objective lens output) detected by light receiving element (mW) | 0.004 | 0.009 | 0.016 | 0.063 |

Then, a description will be given of a preferred range of a supply current $I_{led}$ to a laser in a spontaneous light emission interval using FIG. 8 and Table 1. If a current (a threshold current) at a boundary between a spontaneous light emission region and a light emission region of the laser is indicated by Ith, a supply current $I_{led}$ to the laser is necessary to be less than the threshold current Ith as expressed by the following relation:

$I_{led} < Ith$.

In order not to cut off a transistor at a driving stage of the laser driving circuit 140 so that transition to laser light emission after the spontaneous light emission interval can be performed smoothly, the following relation is preferably satisfied:

$Ith/4 \leq I_{led}$.

Herein, a preferable range η1 of a supply current $I_{led}$ to the laser is, as shown in FIG. 8, preferably expressed by the following relation:

$Ith/4 \leq I_{led} \leq Ith$.

In order to obtain an effect almost equal to that of turning the laser off in the spontaneous light emission region, a current $I_{led}$ satisfying the following relation is preferably supplied to the laser:

$I_{led} \leq Ith*3/4$.

Therefore, a preferable range Δ2 of a supply current lied to the laser is expressed by the following relation:

$Ith/4 \leq I_{led} \leq Ith*3/4$.

Note that $I_{led}$ is more preferably Ith/2.

Note that in a case where a temperature drift of the laser power detecting means 100 is large, a spontaneous light emission interval is provided in a test light emission pattern, thereby enabling an offset to be calibrated in a proper manner.

In each embodiment of the invention, a rewritable optical disk is adopted in the description and therefore, light emission is performed at a bias power in formation of a recording space, the invention is not limited to the situation. For example, in a case where the invention is applied to a write-once optical disk, no necessity arises to cause the laser to emit light at a bias power with which a recording space is formed. In such a case, a bias power light emission interval may be omitted in a test light emission pattern.

In each embodiment of the invention, test light emission is effected in a laser control region provided on a recording track of an optical disk to calibrate a laser power. The invention is not limited to such a construction and may adopt a construction in which no laser control region is provided on the optical disk and test light emission is effected in a sector that is rewritable to calibrate a laser power, followed by rewriting the rewritable sector.

As described above, a laser power control method in each embodiment of the invention is such that since the average value is detected in a multipulse light emission region in a laser control region and a laser power is controlled based on detection information on the average value, each power value of a light pulse can be controlled with good precision even in a case where a frequency characteristic of the laser power detecting means is not sufficiently secured.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

The present disclosure relates to subject matter contained in Japanese Application No. 2003-101249, filed on Apr. 4, 2003, the contents of which are herein expressly incorporated by reference in its entirety.

What is claimed is:

1. A method for controlling a laser power used to record a recording mark on a laser controlling region of an optical disk, comprising:

causing a laser to emit a test light emission pattern including a multipulse light emission interval in which a pulse current intensity-modulated between a peak value current and a bottom value current in formation of a recording mark onto the optical disk is supplied to thereby cause the laser to emit light pulses, and an at-bottom value continuous light emission interval in which the bottom value current is continuously supplied for a predetermined time to thereby cause the laser to emit light continuously;

receiving the test light emission pattern of the laser to convert the pattern to an electric signal and to thereby obtain a light detection signal;

calculating a detection value of a multipulse average value from an average value of the light detection signal in the multipulse light emission interval, and calculating a bottom detection value from the light detection signal in the at-bottom value continuous light emission interval to obtain a light emission power characteristic of the laser on a supplied current based on the detection value of the multipulse average value and the bottom detection value; and controlling the current supplied to the laser based on the light emission power characteristic on the current supplied to the laser, wherein a time width Tmp of the multipulse light emission interval is longer than a time width of a recording mark included in a frame sync, the time width of the recording mark included in the frame sync being longer than a time width Tmax of a longest recording mark of data in a recording region of the optical disk.

2. The method for controlling a laser power according to claim 1, wherein causing the laser to emit the test light emission pattern comprises including an at-bias value continuous light emission interval in which a bias value current in formation of a recording space is supplied continuously for a predetermined time to thereby cause the laser to emit light continuously and, obtaining the light emission power characteristic of the laser comprises calculating a bias detection value based on the light detection signal in the at-bias value continuous light emission interval to thereby obtain the light emission power characteristic of the laser on the supplied current based on the bias detection value, the detection value of a multipulse average value and the bottom detection value.

3. The method for controlling a laser power according to claim 1, wherein causing the laser to emit the test light emission pattern comprises including a spontaneous light emission interval in which a current less than a threshold current at which the laser emits light is supplied to the laser to cause spontaneous light emission and, obtaining the light emission power characteristic of the laser comprises detecting an offset on a detection value of the light detection signal in the spontaneous light emission interval.

4. The method for controlling a laser power according to claim 1, wherein causing the laser to emit the test light emission pattern comprises including a light-off interval in which a supplied current is set substantially to zero to turn the laser off, and obtaining the light emission power characteristic of the laser comprises detecting an offset based on a detection value of the light detection signal in the light-off interval.

5. The method for controlling a laser power according to claim 1, wherein the time width Tmp of the multipulse light emission interval satisfies the following relation with respect to a wobble cycle $T_{wbl}$ on a recording track of the optical disk:

$Tmp<T_{wbl}/2$.

6. The method for controlling a laser power according to claim 1, wherein a time width Tb of the at-bottom value continuous light emission interval satisfies the following relation with respect to the time width Tmax of the longest recording mark of data in the recording region of the optical disk:

$Tmax<Tb$.

7. The method for controlling a laser power according to claim 6, wherein the time width Tb of the at-bottom value continuous light emission interval satisfies the following relation with respect to a wobble cycle $T_{wbl}$ on a recording track of the optical disk:

$Tb<T_{wbl}$.

8. The method for controlling a laser power according to claim 1, wherein the time width Tmp of the multipulse light emission interval and a time width Tb of the at-bottom value continuous light emission interval satisfy the following relation with respect to a time width $T_{apcarea}$ during which scanning is performed over a laser power control region provided on the optical disk for controlling a power of the laser:

$Tmp+Tb<T_{apcarea}$.

9. The method for controlling a laser power according to claim 2, wherein a time width Te of the at-bias value continuous light emission interval satisfies the following relation with respect to a time width Tmax of the longest recording mark of data in a recording region of the optical disk:

$Tmax<Te$.

10. The method for controlling a laser power according to claim 9, wherein the time width Te of the at-bias value continuous light emission interval satisfies the following relation with respect to a wobble cycle $T_{wbl}$ on a recording track of the optical disk:

$Te<T_{wbl}/2$.

11. The method for controlling a laser power according to claim 3, wherein a time width T0 of the spontaneous light emission interval satisfies the following relation with respect to the time width Tmax of the longest recording mark of data in the recording area of the optical disk:

$Tmax<T0$.

12. The method for controlling a laser power according to claim 11, wherein the time width T0 of the spontaneous light emission interval satisfies the following relation with respect to a wobble cycle $T_{wbl}$ on a recording track of the optical disk:

$T0<T_{wbl}$.

13. The method for controlling a laser power according to claim 4, wherein a time width T0 of the light-off interval satisfies the following relation with respect to a time width Tmax of the longest recording mark of data in the recording area of the optical disk:

$Tmax<T0$.

14. The method for controlling a laser power according to claim 13, wherein the time width T0 of the light-off interval satisfies the following relation with respect to a wobble cycle $T_{wbl}$ on a recording track of the optical disk:

$T0<T_{wbl}$.

15. The method for controlling a laser power according to claim 3, wherein in the spontaneous light emission interval, a current $I_{led}$ supplied to the laser satisfies the following relation with respect to a threshold current Ith of the laser:

$Ith/4 \leq I_{led} < Ith$.

16. The method for controlling a laser power according to claim 3, wherein in the spontaneous light emission interval, a current $I_{led}$ supplied to the laser satisfies the following relation with respect to a threshold current Ith of the laser:

$Ith/4 \leq I_{led} \leq Ith*3/4$.

17. The method for controlling a laser power according to claim 3, wherein in the spontaneous light emission interval, a current $I_{led}$ supplied to the laser satisfies the following relation substantially with respect to a threshold current Ith of the laser:

$I_{led}=Ith/2$.

18. An apparatus for controlling a laser power used to record a recording mark on a laser controlling region of an optical disks, comprising:

a formatter having a test light emission pattern including a multipulse light emission interval in which a pulse current intensity-modulated between a peak value current and a bottom value current in formation of a recording mark onto the optical disk is supplied to a laser to thereby cause the laser to emit light pulses, and an at-bottom value continuous light emission interval in which the bottom value current is continuously supplied to the laser for a predetermined time to thereby cause the laser to emit light continuously;

a laser driving unit that supplies a current to the laser based on the test light emission pattern transmitted from the formatter to cause a test light emission;

a laser power detecting unit that receives the test light emission pattern of the laser to convert the pattern to an electric signal and to thereby obtain a light detection signal; and an arithmetic unit that calculates a detection value of a multipulse average value from an average value of the light detection signal in the multipulse light emission interval, and which calculates a bottom detection value from the light detection signal in the at-bottom value continuous light emission interval to obtain a light emission power characteristic of the laser on a supplied current based on a detection value of a multipulse average value and the bottom detection value, and to control a current supplied to the laser based on the light emission power characteristic, wherein a time width Tmp of the multipulse light emission interval is longer than a time width of a recording mark included in a frame sync, the time width of the recording mark included in the frame sync being longer than a time width Tmax of a longest recording mark of data in a recording region of the optical disk.

19. An apparatus for controlling a laser power according to claim 18, wherein the test light emission pattern further includes an at-bias value continuous light emission interval in which a bias value current in formation of a recording space is supplied to the laser continuously for a predetermined time to thereby cause the laser to emit light continuously, and in the arithmetic unit, a bias detection value is further calculated based on the light detection signal in the at-bias value continuous light emission interval to thereby obtain the light emission power characteristic of the laser on the supplied current based on the bias detection value, the detection value of a multipulse average value and the bottom detection value.

20. The apparatus for controlling a laser power according to claim 18, wherein the test light emission pattern further includes a spontaneous light emission interval in which a current less than a threshold current of the laser is supplied to cause spontaneous light emissions, and the arithmetic unit detects an offset based on a detection value of the light detection signal in the spontaneous light emission interval.

* * * * *

UNITED STATES PATENT AND TRADEMARK OFFICE
CERTIFICATE OF CORRECTION

| | | |
|---|---|---|
| PATENT NO. | : 7,310,293 B2 | Page 1 of 1 |
| APPLICATION NO. | : 10/815782 | |
| DATED | : December 18, 2007 | |
| INVENTOR(S) | : Senga et al. | |

It is certified that error appears in the above-identified patent and that said Letters Patent is hereby corrected as shown below:

At column 18, line 67 (claim 18, line 3), "optical disks," should be --optical disk,--.

Signed and Sealed this

Twenty-second Day of July, 2008

JON W. DUDAS
*Director of the United States Patent and Trademark Office*